Aug. 13, 1968  K. WEINHOLD  3,396,993
QUICK COUPLING DEVICE FOR HOSES
Filed Sept. 6, 1966
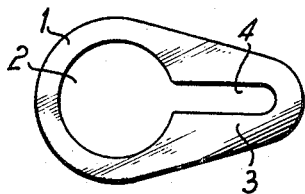
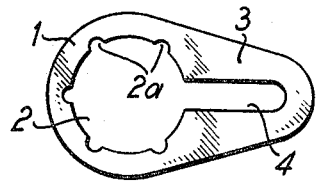
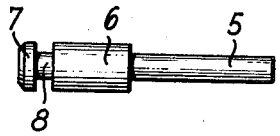
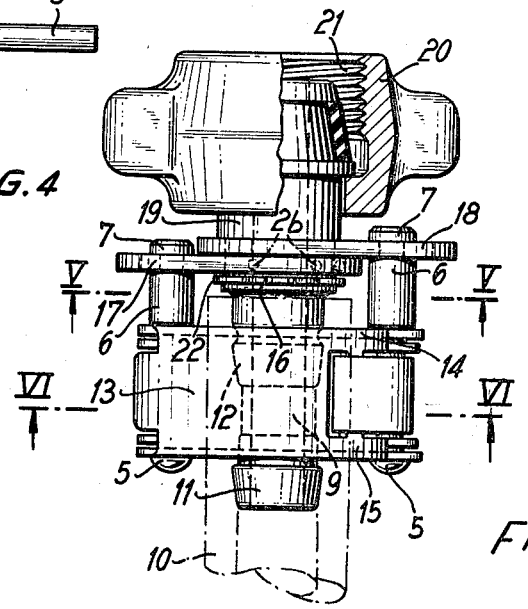
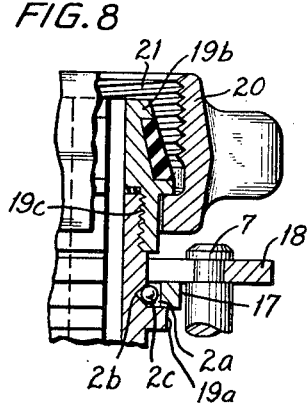
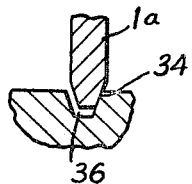
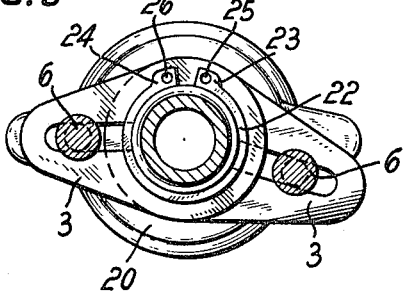
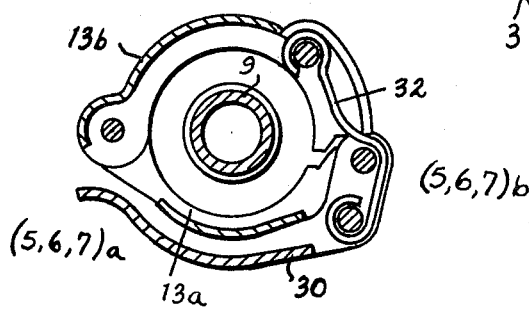
INVENTOR
KARL WEINHOLD
by Melvin A. Crosby

United States Patent Office 3,396,993
Patented Aug. 13, 1968

3,396,993
QUICK COUPLING DEVICE FOR HOSES
Karl Weinhold, Kreitzweg 8, Holzheim,
near Neuss, Rhineland, Germany
Filed Sept. 6, 1966, Ser. No. 577,501
14 Claims. (Cl. 285—114)

ABSTRACT OF THE DISCLOSURE

A hose coupling having a tubular member for insertion into the end of a rubber-like hose and half-sleeves on the tubular member to engage about the hose and press it into sealing and mechanically fixed relation with the tubular member. Pins extending axially along opposite sides of the tubular member pivotally support the half-sleeves and also support a clamping mechanism therefor and discs mounted on the tubular member support the pins.

---

This invention relates to improvements in hose fasteners or connectors.

Hose fasteners or connectors, also referred to as hose clamps or couplings are known; one such device being shown in my copending application Ser. No. 410,405, filed Nov. 12, 1964, now Patent No. 3,272,536, and entitled "Quick Coupling Device for Hoses." The present invention relates to improvements in quick coupling devices of the nature shown in the said application.

In the said pending application, a hose fastening is shown in which a double clamp, consisting of two articulately connected half bushings or half sleeves, with a tubular member lying between them on whose end a flexible hose is drawn, is connected in such a way that on closing the double clamp, as by means of an overcenter closer lever, the hose is clamped by the half sleeves and sealingly presented against the wall of the tubular member. In this construction, a joint pin articulately connecting the two half sleeves of the double clamp is extended and is connected rotatably but axially immovably with the tubular member itself by means of a resilient clamp releasably engaging this extended portion of the joint pin. The resilient clamps used in accordance with the said application are made in the form of an open yoke of spring metal, such as steel, preferably of square cross-section, which when the yoke is pushed over the joint pin and the tubular member engage by the free ends of the arms of the yoke in a corresponding groove in the tubular member.

It has already been proposed in the said application to provide such a securing of the two half sleeves of the double clamp on the tubular member utilizing, not only the said extended joint pin, but also a second joint pin lying substantially diametrically opposite the first joint pin, which latter pin serves to connect the closer lever with the end of the tubular member and one end of one of the half sleeves, bilaterally, so that the forces transmitted from the fastening yokes to the tubular member are distributed on it substantially symmetrically and uniformly.

The present invention relates to a further and improved form of such a fastening, clamping or coupling device for hoses, and also to a device for fastening hoses to a pipe or conduit, or valve or the like, in which, in particular, the parts connecting the joint pin of the double clamp with the nozzle are made in an improved and more advantageously effective form.

According to the present invention, there is provided a fastening device similar to that of the said application, in which the connecting members between a tubular member and extended joint pins are formed as rigid discs, which discs releasably engage by their rim portions in grooves provided in the tubular member and in the reinforcement of the joint pin and in this way hold the fastening axially immovable against the tubular member. To this end the said disc-shaped connecting member is provided with a main recess which surrounds the tubular member. The inner rim of the main recess engages in a groove cut in the periphery of the tubular member, thus preventing any axial displacement therebetween. The main recess in the disc is large enough for a reduced diameter end part of the tubular member to be pushed through it. When the connecting disc is finally placed in position a portion of the inner periphery of the main recess is disposed in a groove provided in the tubular member by a nut or snap ring on the end of the reduced diameter part of the tubular member.

The portion of the connecting disc surrounding the reinforcement of the extended joint pin takes the form of a lateral extension of the disc. There is provided in the extension a slot forming an extension of the above-mentioned recess surrounding the tubular member. The slot fits in a groove provided in the extended joint pin and engages by its inner rim in this groove.

With a connecting disc of the kind described above, therefore, the tubular member and the joint pin are secured undisplaceable axially in respect to one another.

This construction of the connecting member between the tubular member and the joint pin in the form of a closed disc provided with corresponding recesses offers complete security against any loosening or unintentional interruption of the connection between the extension of the joint pin and the tubular member, even if shocks should act from the exterior of the radial direction on the connecting parts. The proposed construction of the connection between the tubular member and joint pin further ensures a uniform transmission of the forces exerted by the connecting parts on the tubular member and, hence, on the hose connection, over the whole periphery of the tubular member.

The connecting discs constructed in accordance with the invention are advantageously made of spring metal, such as steel, to give them the desired strength, although, differing in this from the open yokes used hitherto, they do not need to develop any elastic resiliency on application to the joint pins of the double clamp and to the tubular member. The connecting disc can, therefore, together with its recess surrounding the tubular member and the lateral extension provided with a slot, be stamped out of sheet material. The portion of the inner rim of the recesses which engage the tubular member and which enter the grooves in the extended joint pin, have, like the grooves, an angled profile.

The fastening of the connecting disc to the tubular member can be effected by the connecting disc being pushed against a collar or shoulder on the tubular member and secured in this position by a spring ring or nut on the end of the tubular member. The connecting disc can also be provided on the inner rim of its main recess surrounding the tubular member with one or more stamped grooves, whose bores correspond to the periphery of the tubular member. The tubular member and connecting disc are then secured against rotation by a ball inserted in the corresponding bore of the tubular member, on which the connecting disc with the corresponding groove is pushed.

Still further, the tubular member could have a groove formed therein and the disc, when pressed on the tubular member axially, would snap into the groove and retain the disc and tubular member assembled. For this purpose, the disc, in the region forming the periphery of the main recess, could be slit or otherwise cut so the disc was yieldable.

These and other objects and advantages of this invention will become more apparent upon reference to the following specification taken in connection with the accompanying drawings, in which:

FIGURE 1 is a plan view of a disc-like connecting member in the form of a closed disc provided with aperture means as recesses, which is used in accordance with the invention;

FIGURE 2 is a plan view of a modification of the disc-like connecting member of FIGURE 1;

FIGURE 3 is a view of a joint pin of the fastening device prior to assembly;

FIGURE 4 is a side view, partly in section, of the hose fastening device constructed in accordance with the invention;

FIGURE 5 is a section through the device, indicated by line V—V in FIGURE 4;

FIGURE 6 is a section on line VI—VI of FIGURE 4;

FIGURE 7 is a fragmentary view showing how the periphery of the recess of the connecting disc could be profiled; and FIGURE 8 is a fragmentary view, partly in section, showing how the tubular member could be provided with a threaded portion.

Referring to the drawings more in detail, in FIGURE 1 the reference numeral 1 designates the connecting member made in the form of a flat disc, preferably consisting of spring metal, such as steel, and adapted to act as a connection between the extended joint pin and the tubular hose receiving member of the double clamp. Member 1 is provided in its substantially circular portion with a recess 2 which, like the whole outer shape of the disc can be stamped out of a spring metal sheet of, for instance, 2 to 5 mm. thickness, depending on the size of the fastening and the stresses to which it may be subjected.

Member 1 has an extension 3 projecting radially from one side, in which is a slot 4 communicating with and extending laterally from recess 2, and smaller in lateral dimension than recess 2. The recess 2 corresponds in diameter to the diameter of the portion of the tubular member of the device which is led through the recess. The slot 4, the outer end of which is preferably rounded, corresponds to the diameter of the groove provided in the joint pin extension of the device. The disc of FIGURE 1 is freely rotatable on the tubular member.

The connecting disc 1, constructed in accordance with FIGURE 1, may also be so constructed in accordance with FIGURE 2 so that it, together with the two half sleeves forming the coupling members, is no longer mounted freely rotatable on the tubular member, but is connected thereto in such a way as to exclude any rotation. For this purpose there are stamped out in the inner rim of the recess of the connecting disc 1, one or more grooves 2a, which correspond to bores in the tubular member at the axial region thereof at which the disc is arranged. For each stamped-in groove 2a, there may be a corresponding bore 2b in the tubular member. A ball is inserted in this bore in the tubular member jacket. The connecting disc 1 is pushed over this ball, so that one of its said grooves engages over the ball. The connecting disc with its two coupling members or sleeve halves is then secured to the tubular member fast to rotation. By this a predetermined position of the coupling device in relation to the hose or to the connecting valve or conduit is obtained. This position can be varied by angular adjustment of the connecting disc on the tubular member.

The tubular member could also be formed with one or more ridges thereon to extend into one or more of the grooves 2a thereof to key the connector member to the tubular member in a predetermined rotating position thereon.

The maintenance of a given position of the coupling in relation to the hose or the connecting conduit or valve is important because it makes for easier manipulation of the coupling. If such a determinate position were not available, the coupling might rotate in relation to the hose if, for instance, the operator had temporarily only one hand free to hold the coupling, so that the coupling could turn into an awkward position and be difficult to operate.

In FIGURE 3 a joint pin is shown by way of example, the shank of which is designated 5, and the reinforced extension as 6, 7. There is turned in the extension a groove 8 serving for the insertion of the part 3 of the disc in accordance with FIGURE 1. After applying the connecting disc between the tubular member and the joint pin, and mounting the coupling sleeve halves and lever in place, the free end of the shank 5 of the pin can be riveted over, as shown in FIGURE 4.

In FIGURE 4 the hose drawn over the free end of tubular member 9 is designated 10. The end of the tubular member may advantageously be provided with two axially spaced beads 11, 12 rising conically toward the rear and sharply offset on the rear side. Behind these beads the two sleeve halves of a double clamp 13 engage by their narrow radial end flanges 14 and 15. The sleeve halves of the double clamp are pivotally connected together by a joint pin 5, 6, 7 of the kind represented in FIGURE 3. A similarly formed joint pin 5, 6, 7 on the opposite side of the coupling connects the lever used to open and close the double clamp with one of the sleeve halves.

The connection between the portions 6, 7 of the joint pins and the rear reinforced part 16 of the tubular member is effected by two discs 17, 18 which, according to FIGURE 1, are made closed. The longitudinal slots 4 of these discs are inserted in the grooves of the extended joint pins, while their annular portions 1 surround the tubular member. The rear flange disc is applied against a collar 19 of the tubular member. The tubular member may be provided with a check nut 20 having a screw thread 21. In a rounded groove 2a provided on the inner periphery of the recess 2 of the disc there engages a ball inserted in a bore 2b of the nozzle periphery, so that rotation of the parts in relation to one another is prevented.

Instead of having a check nut, the tubular member could also be formed as a double ended tubular member or could be provided with male and female threads.

The fixing of the discs 17 and 18 in their seating against the reinforced collar 19 of the nozzle can be effected in various ways, e.g., by a screw thread cut on the front end of the reinforced portion 16 of the tubular member and a nut placed thereon, and the like. The simplest, most rapidly applicable and easily releasable fastening consists of a cut-out resilient flat ring 22 placed in front of the front disc 17, which engages in a groove cut in the tubular member. The spring ring 22 may advantageously be widened at its ends 23 and 24 and provided with apertures 25, 26 for the insertion of a removing and installing tool.

The application of the connecting discs 17, 18 is preferably effected by these discs first of all be pushed on the extensions 6, 7 of the joint pin, then pushed in the manner shown in FIGURE 4 on the portion 16 of the tubular member, and then secured by applying the spring ring 2 in its place. It can be dismounted in the same way by removing the spring ring.

FIGURE 6 shows how a first one of pivot pins (5, 6, 7) pivotally interconnects a first sleeve half 13a at one end to one end of second sleeve half 13b, while a second one of the pivot pins (5, 6, 7)b pivotally connects closing lever 30 to the other end of the first sleeve half 13a. A spring-like line 32 connects the second sleeve half 13b near its other end to a point on lever 30 spaced from pin (5, 6, 7)b so the point will pass over center when the lever moves from closed to open position.

FIGURE 7 shows how disc 1a could be profiled at 34 around the aperture therein while receiving groove 36 could also be profiled.

The construction described of a hose fastening offers important advantages. By its means the double clamp is held fast so that it cannot slip in relation to the tubular member, so that it always grips the hose at the same place and at the same distance behind the offset surface of the beads 11, 12 of the tubular member. Such an arrangement develops, as a result of the maintenance of spacing and setting of the clamping sleeve halves in relation to the beads, a sealing effect which is satisfactory under all conditions and which does not fail even under high pressures, say of several hundred atmospheres. It has been found, in practice, that in every case the hose is destroyed before the connection of the same with the tubular member is released.

The construction in accordance with the invention of the discs 17 and 18 further ensures complete security of the connection against exterior forces, e.g., blows, shocks and so on, so that the improved construction described of such a fastening therefore offers complete security for all cases in which extreme loads have to be withstood or security has to be obtained against accidental disturbances of any kind, e.g., in mining, in underwater operation, and the like.

It will be appreciated that both of discs 17, 18 could be made in conformity with the showing of FIGURE 1 in which case the clamping sleeve halves could rotate on the tubular member. However, if non-rotation of the sleeve halves on the tubular member was desired, one or both of the discs would be formed according to FIGURE 2, and the tubular member provided with one or more protuberances or balls to engage one or more of the grooves or notches 2a in one or the other of the discs.

In FIGURE 8, the tubular member has a collar 19a formed thereon and an end portion 19b threaded on the end by threads 19c for retaining discs 17 and 18 in place on the tubular member between the collar and the end portion.

FIGURE 8 also shows a ball 2c in a bore 2b in the tubular member. Ball 2c engages a notch 2a in disc 17 and serves as a key to hold the disc against rotation on the tubular member.

It will be understood that this invention is susceptible to modification in order to adapt it to different usages and conditions and, accordingly, it is desired to comprehend such modifications within this invention as may fall within the scope of the appended claims.

What is claimed is:

1. A device for coupling to a hose comprising: a tubular member having one end adapted for insertion into the end of a hose and having a portion extending from said one end, first and second sleeve halves adapted for being closed around said one end of said tubular member to clamp a hose sealingly thereon, a lever movable for drawing said sleeve halves together into hose end clamping position, a first pin extending in the axial direction of said tubular member on one side thereof and pivotally interconnecting said first and second sleeve halves at one circumferential end thereof, a second pin parallel to said first pin on the other side of said tubular member and pivotally interconnecting said lever with the other circumferential end of said first sleeve half, connecting link means extending from a point on the lever spaced from said second pin to said second sleeve half, said pins having axial portions extending along the said portion of said tubular member, and means connecting said pins with said tubular member comprising a flat disc for each pin extending in a plane normal to the axis of said tubular member and having closed aperture means therein receiving said portion of said tubular member and said portion of the pertaining pin, said tubular member and said pins having circumferential groove means therein engaging opposite sides of said discs around said aperture means to hold said pins and tubular member against relative axial movement.

2. A coupling device according to claim 1, in which the aperture means in each disc is in the form of a single closed aperture having a main part for receiving said tubular member, and a slot-like part extending radially from said main part for receiving the respective pin.

3. A coupling device according to claim 2, in which said discs are in face-to-face engagement about said tubular member.

4. A coupling device according to claim 3, in which said portion of said tubular member and said portions of said pins are respectively larger in diameter than said one end of said tubular member and the parts of said pins that engage said sleeve halves and lever.

5. A coupling device according to claim 3, in which said discs are stamped out from flat spring metal stock and each has a larger portion in which said main part of said aperture means is disposed, and a finger-like projection in which said slat-like part of the aperture means is disposed.

6. A coupling device according to claim 3, in which the regions of said discs forming the periphery of said aperture means has an angular profile.

7. A coupling device according to claim 3, in which the said groove means in said portion of said tubular member is formed by a shoulder on said tubular member on one side of said discs, and a member removably mounted on said tubular member on the other side of said discs.

8. A coupling device according to claim 7, in which the said removably mounted member is a nut threaded on said tubular member.

9. A coupling device according to claim 7, in which the said removably mounted member is a snap ring seated in a groove therefor provided in said tubular member.

10. A coupling device according to claim 3, in which at least one disc has notch means therein at the periphery of said main part of said aperture means for receiving key means on said tubular member to hold said tubular member and at least said one disc against relative rotation.

11. A coupling device according to claim 10, in which said notch means comprises at least two circumferentially spaced notches to provide for indexed positions of said one disc on said tubular member.

12. A coupling device according to claim 11, in which said key means is in the form of base means in said tubular member and ball means therein.

13. A coupling device according to claim 11, in which said tubular member at its end opposite said one end includes means for fixed connection of the tubular member to a stationary fluid conducting element.

14. A coupling device according to claim 7, in which said sleeve halves include axially spaced radially inwardly directed flanges, and said one end of said tubular member includes head portions adjacent said flanges, said head portions having tapered approach regions for the base end and abrupt terminal shoulders, said flange being in planes adjacent said shoulders.

References Cited

UNITED STATES PATENTS 3,206,230 9/1965 Weinhold _____ 285—114
3,272,536 9/1966 Weinhold _____ 285—114

CARL W. TOMLIN, *Primary Examiner.*

T. J. CALLAGHAN, *Assistant Examiner.*